UNITED STATES PATENT OFFICE.

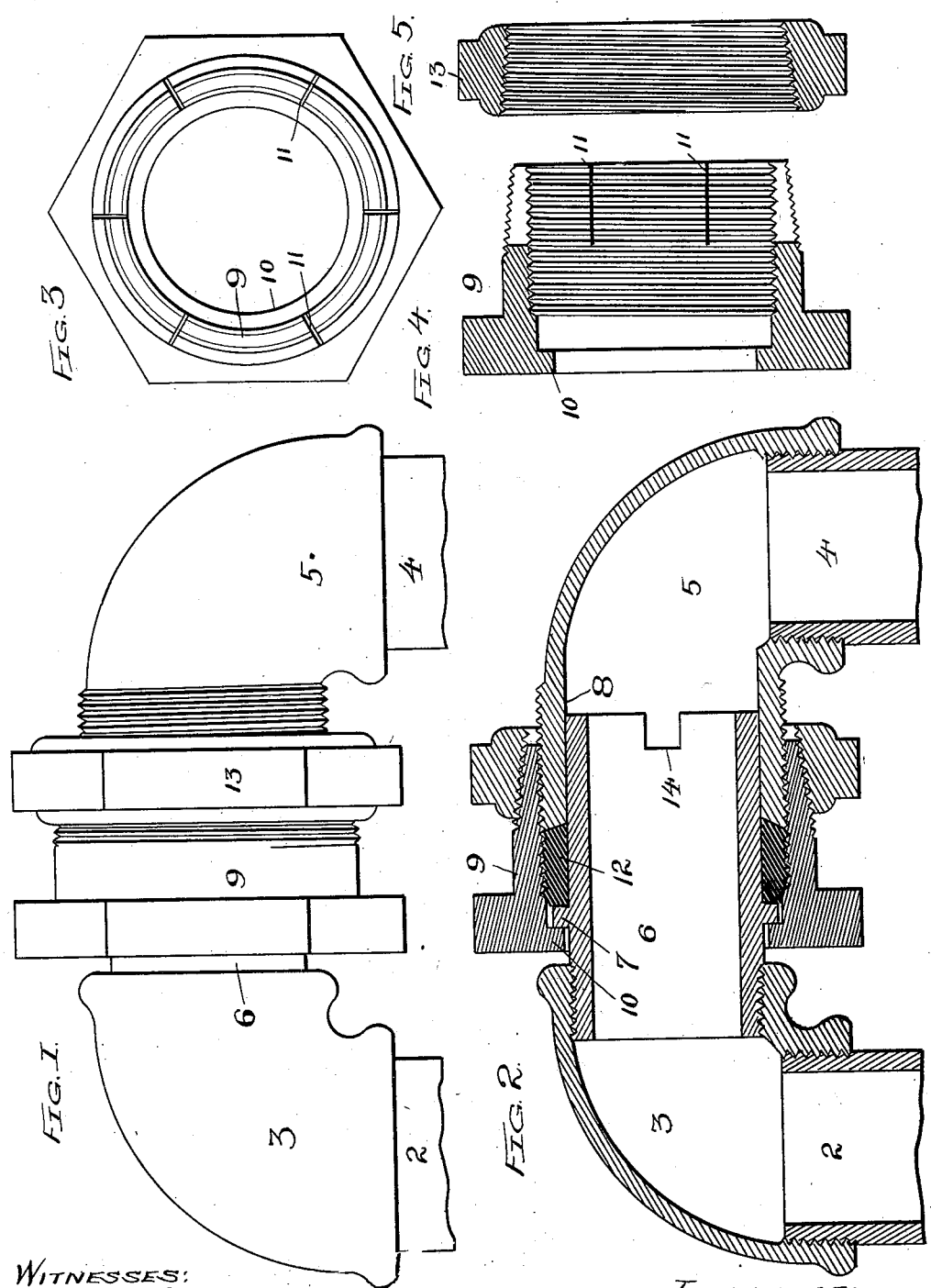

ADOLPH LEITELT, JR., OF GRAND RAPIDS, MICHIGAN, ASSIGNOR TO AARON S. NICHOLS, OF CHICAGO, ILLINOIS.

FLEXIBLE JOINT FOR PIPES.

SPECIFICATION forming part of Letters Patent No. 652,789, dated July 3, 1900.

Application filed August 17, 1899. Serial No. 727,488. (No model.)

*To all whom it may concern:*

Be it known that I, ADOLPH LEITELT, Jr., a citizen of the United States, residing in Grand Rapids, in the county of Kent and State of Michigan, have invented a new and useful Improvement in Flexible Joints for Pipes, of which the following is a specification.

This invention relates to the construction of swing or flexible joints for steam and other pipes. It is intended to prevent any loosening or unscrewing of the threaded unions employed in such joints, and its nature will be fully understood from the accompanying drawings, in which—

Figure 1 is an exterior view of a joint embodying my invention. Fig. 2 is a section of the joint. Fig. 3 is an end view, and Fig. 4 a section, of the gland detached; and Fig. 5 is a section of the locking-nut.

In said drawings, 2 represents one of the moving pipes united by my invention, and 3 an elbow threaded thereon. 4 is the other moving pipe, and 5 an elbow attached thereto. The pipes 2 and 4 may be arranged in parallel planes or at any angle desired. As shown, they are parallel, or nearly so. The elbows are united by my invention, and to this end the elbow 3 is threaded interiorly, so it may receive and engage the end of a short tube or thimble 6, having an annular exterior collar or flange at 7. The other elbow 5 has a smooth and elongated straight bore 8, fitting the exterior of the tube loosely and permitting the latter to slide freely into the elbow, and the exterior of this straight portion of the elbow 5 is threaded, as plainly shown. A surrounding gland 9 is employed to draw the two elbows toward each other, and to enable it to do this it is provided with an interior shoulder 10 at one end, adapted to engage the collar 7 of the tube 6, and with an interior thread at the other end whereby it may engage elbow 5. The gland is hexagonal at one end of its exterior, so it may be turned by a wrench, and at its other end it tapers in diameter, and a thread is cut on this tapered portion. It is also made compressible at the tapered end by means of the longitudinal slits 11. Packing 12 is inserted in the open space formed inside the gland and between the collar 7 and the end of elbow 5.

In assembling the parts the gland is turned until the elbows are brought near enough together to cause the desired compression on the packing, and a locking-nut 13, the threaded interior of which is tapered to correspond to the taper of the gland, is then forced on the latter until it compresses the slotted end of the gland and firmly locks the same against any possible turning on or loosening from elbow 5. While the gland is thus firmly fastened to the elbow 5, the tube 6 is free to turn in the gland and also in elbow 5 and is thus relieved from the strong friction and tendency to bind with said elbow which it has possessed in prior structures and which has heretofore caused the tube to loosen from the elbow or pipe to which it is threaded. The tube 6 is turned when attaching it to or detaching it from elbow 3 by inserting in it an appropriate tool engaging the notch or notches 14, cut in its end.

It is desirable that at least one of the opposing surfaces at the ends of the packing 12 be beveled inwardly, so as to compress the packing somewhat toward the axis of the joint. I have shown such a bevel on the end of section or elbow 5, and thereby greatly improve the tightness of the joint.

I claim—

1. The combination in a flexible joint for pipes, of the tube 6, threaded to one of the parts joined, and sliding in the other and having an exterior collar, the gland engaging said collar and threaded to the exterior of the other part to be joined, and also having one end tapered and threaded exteriorly, and also slitted, and a lock-nut fitting said tapered and slitted end of the gland, substantially as specified.

2. The combination in a flexible joint for pipes, of a tube fastened to one of the movable pipes or elbows, and sliding in the other, a tapering, threaded and slitted gland for drawing the pipes or elbows together, and a lock-nut compressing the slitted portion of the gland, substantially as specified.

3. The combination in a flexible joint for pipes, of a gland 9, held to one of the movable pipes or elbows and threaded on the other, and also tapered, threaded and slitted at the end thus threaded on the movable pipe or elbow, a lock-nut compressing said slitted end of the gland, and a packing 12 surrounded by said gland and compressed between opposing surfaces at its ends, one of said surfaces being beveled inwardly, substantially as and for the purpose set forth.

ADOLPH LEITELT, JR.

Witnesses:
E. J. SHINKMAN,
CHRISTIAN FREY.